United States Patent

[11] 3,581,002

| [72] | Inventor | Wellesley Jamison Dodds |
| | | Mt. Lakes, N.J. |
| [21] | Appl. No. | 811,861 |
| [22] | Filed | Apr. 1, 1969 |
| [45] | Patented | May 25, 1971 |
| [73] | Assignee | RCA Corporation |

[54] DISPLAY DEVICE FOR PROVIDING GRATICULES OF VARIOUS CONFIGURATIONS
10 Claims, 2 Drawing Figs.

[52] U.S. Cl. .................................................... 178/7.84,
178/7.83, 350/160
[51] Int. Cl. .................................................... H04n 5/72
[50] Field of Search .......................................... 350/160
(LC), 160, 161; 178/7.83, 7.84

[56] References Cited
UNITED STATES PATENTS
3,499,112  3/1970  Heilmeier ..................... 350/160

FOREIGN PATENTS
1,123,117  8/1968  Great Britain ................ 350/160

OTHER REFERENCES
Van Raalte— Reflective Liquid Crystal Television Display Proc. of the IEEE Vol. 56. No. 12 Dec. 1968.

Primary Examiner—Robert L. Richardson
Assistant Examiner—Joseph A. Orsino, Jr.
Attorney—Glenn H. Bruestle ABSTRACT: A novel display device including a means for displaying a visual image to the view of an observer and a means for providing a changeable graticule in front of the visual image in the view of the observer. The means for providing a changeable graticule includes a plurality of transparent electrode pairs with a liquid crystal material contained therebetween for displaying the graticule. Connection means for electrically energizing selected ones of the electrode pairs are provided.

PATENTED MAY 25 1971

3,581,002

INVENTOR
Wellesley J. Dodds

BY
ATTORNEY

3,581,002

DISPLAY DEVICE FOR PROVIDING GRATICULES OF VARIOUS CONFIGURATIONS

BACKGROUND OF THE INVENTION

This invention relates to display devices, and particularly to display devices including means for providing a desired graticule.

Image-producing devices such as cathode ray tubes are well known in the art. Briefly, the conventional cathode ray tube comprises an electron gun, for generating an electron beam within an envelope of glass or other suitable material. In the operation of the cathode ray tube, the electron beam is focused to a spot upon a luminescent screen on the tube. The screen luminesces upon being impinged by the electron beam and the luminescence may be viewed through the faceplate of the tube. Either electrostatic or electromagnetic deflection means are used to displace the beam, in a predetermined pattern to form a visible luminescent trace upon the screen.

The cathode ray tube may be used in electrical apparatus for, inter alia, the observation and measurement of voltage and current waveforms. A cathode ray tube may also be used in a radar apparatus to display an image corresponding to the radar target. The above-mentioned cathode ray tube applications, as well as others, often require a graticule for the cathode ray tube such that the image produced on the tube can be gauged for amplitude (in the case of waveforms); azimuth and/or distance (in the case of radar); and so forth. As used hereinafter, the term "graticule" includes arrays of lines of various configurations and orientations which may be used for gauging or measuring an image or other viewable information.

Previous efforts to provide a cathode ray tube with a graticule have included painting visible lines directly on the cathode ray tube faceplate. This technique is of limited desirability and usefulness where a single tube is desired to have several different graticules; for example, where a single cathode ray tube is to be used for several applications of which each requires a different type of graticule, or where graticules of various measure are desired for a single cathode ray tube application. The reason for the limited usefulness is that the provision of more than a few graticules on the screen of a single tube significantly reduces the viewability of the image produced on the tube screen behind the graticules. Also, the presence of a large number of graticule lines may cause the observer to confuse the lines of one graticule with those of another. Also, because the graticule produced by the above method is not easily removable, this method does not lend itself to the rapid interchanging of graticules.

Other approaches to providing a graticule for a cathode ray tube have included the following. Under one approach, there is first applied to the outer surface of the tube faceplate, a light-sensitive coating, such as a photographic emulsion, for example. The light-sensitive coating is located opposite the phosphor screen disposed on the interior surface of the faceplate. The cathode ray tube with the applied light-sensitive coating thereon, is then operated such that the electron beam of the tube scans the phosphor target in the pattern of the desired graticule. The phosphor screen emits light from those areas impinged by the beam, the emitted light exposing the light-sensitive coating. The coating is then developed according to well-known photographic techniques. This approach results in a processed photographic emulsion on the faceplate, which emulsion has certain portions visible to the observer to act as a graticule, and other portions which are transparent so that the image produced on the screen may be viewed. This approach is not completely satisfactory for the reasons stated below.

Another approach involves printing, by techniques known in the art, on the inner surface of the tube faceplate a plurality of lines of reflective material, such as glass frit, and then fusing the frit. Then, a layer of phosphor is applied to the faceplate, covering the provided lines.

Both of these last two approaches are of limited usefulness because of the limited number of different graticules that may be provided on a single tube; the number being limited for the aforementioned reasons of viewability of the image and confusion of graticule lines. Also, both of these approaches make the graticule a permanent part of the tube to which they have been provided so that there is no facile interchangeability or ability to eliminate graticules completely where these approaches are employed.

One further method previously used to provide graticules to cathode ray tubes involves producing a graticule upon a transparent plastic member and then positioning the plastic member on the cathode ray tube faceplate. Changing graticules involves the removal of one plastic member and the substitution of another. This method is undesirable because a large number of plastic members must be made individually; because changing plastic members is cumbersome and necessitates the proper alignment of each graticule with the faceplate; and because there is the problem of storing the unused plastic members.

It is desirable, therefore, to provide a cathode ray tube with a single device which, inter alia, is able to provide a large number and variety of graticules, either singly or together, with relatively little probability of confusion, by the viewer, of the various graticule lines with substantially no impairment of the viewability of the image to be measured; which lends itself to the relatively rapid and facile interchangeability of graticules; and which is capable of not providing any graticule while it remains mounted on the cathode ray tube, such that the observer is able to see only the image produced by the tube.

SUMMARY OF THE INVENTION

A novel display device including a means for displaying a visual image to the view of an observer and a means for providing a changeable graticule in front of the visual image in the view of the observer. The means for providing a changeable graticule includes a plurality of transparent electrode pairs with a liquid crystal material contained therebetween for displaying the graticule. The liquid crystal material has a nematic mesomorphic phase. Connection means for electrically energizing selected ones of the electrode pairs are provided.

By selectively energizing a desired electrode pair, the observer sees a desired graticule (a scale, grid, calibration, or other marking) superimposed on the visual image. The graticule may be changed simply by energizing a different electrode pair.

The novel display device provides, inter alia, a relatively large number and variety of graticules which can be interchanged with relative speed and ease. The novel display device allows graticules to be totally eliminated with relatively little effort so that only the provided image is viewable. The graticules can be provided either singly or several at the same time, with reduced possibility of confusion of one graticule with another.

DESCRIPTION OF THE PREFERRED EMBODIMENT

Figure 1:
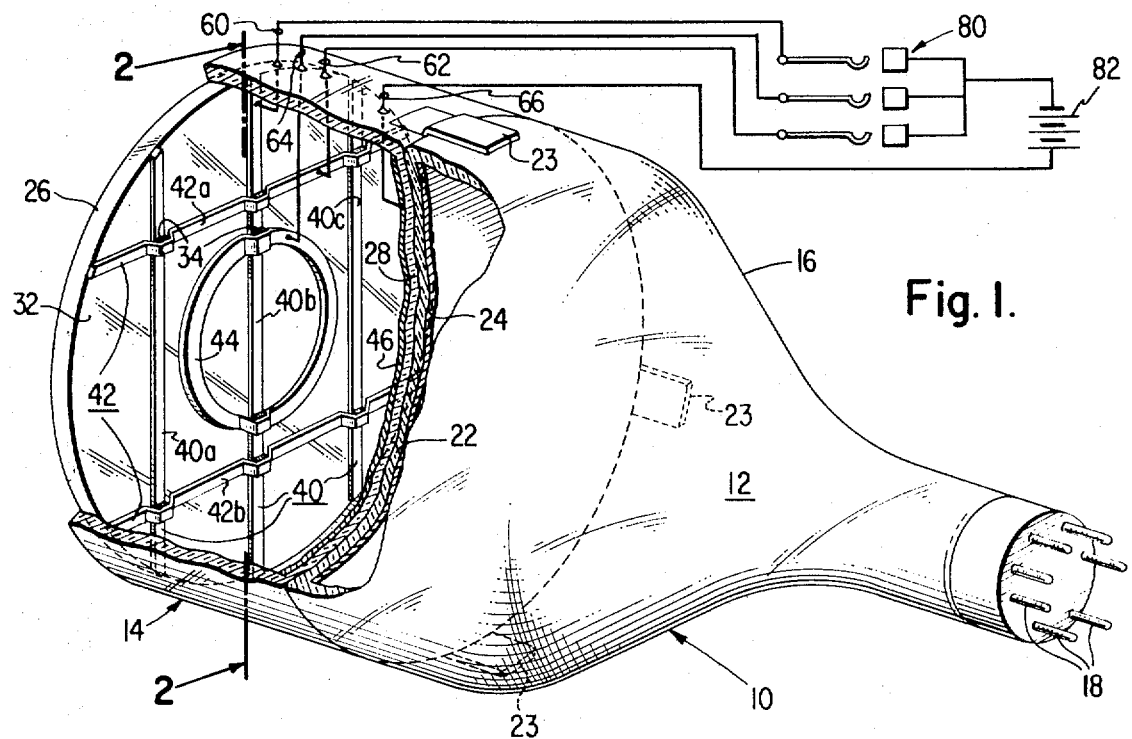
FIG. 1 is a fragmentary perspective view of the novel display device disclosed herein.
Figure 2:
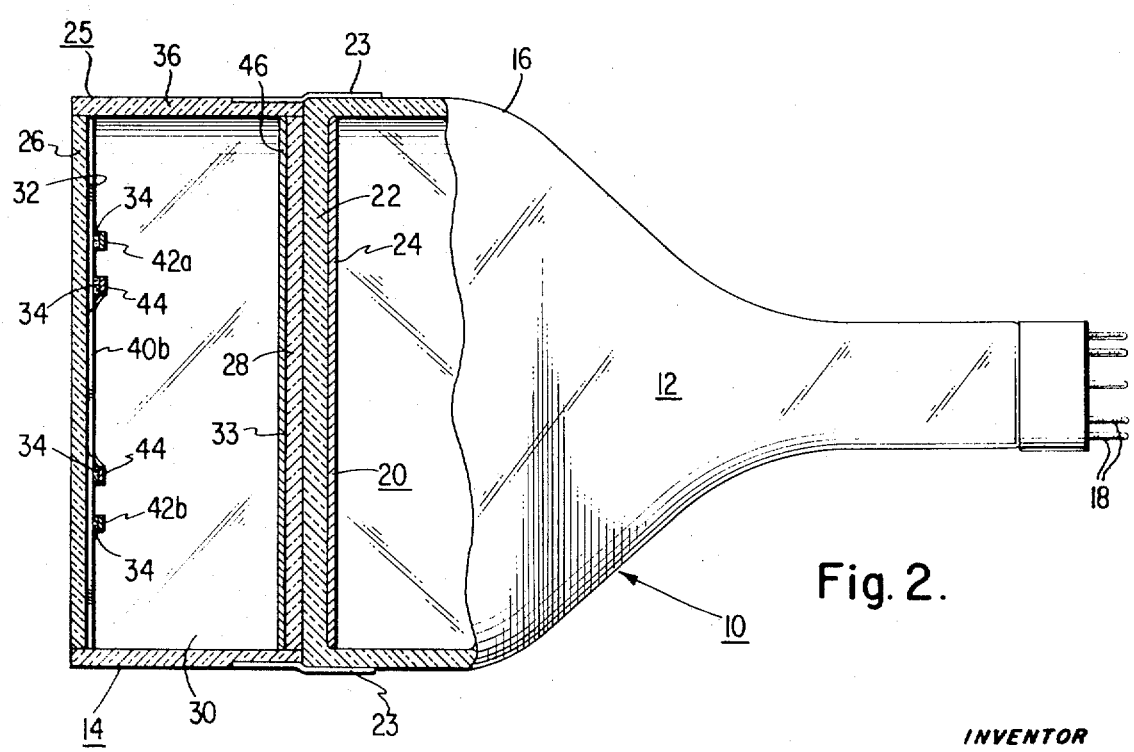
FIG. 2 is a fragmentary sectional elevation view of the novel display device along the 2—2 axis.

FIGS. 1 and 2 illustrate the novel display device 10 with which there can be produced a changeable graticule superimposed upon a visible image. The graticule produced can be used to evaluate images, to determine the location of images with respect to certain predetermined co-ordinates, etc. The display device 10 includes an image-providing means, such as a cathode ray tube 12, and a liquid crystal device 14.

The cathode ray tube 12 is of standard construction, having an envelope 16 of glass or other suitable material. Pins 18 are provided for the connection of the cathode ray tube 12 to an external circuit (not shown). The electrode system for generating and deflecting an electron beam is not shown for purposes of simplicity. The envelope 16 includes a screen 20 comprising a transparent faceplate 22 whose interior surface is coated with a suitable phosphor 24 which will produce a luminous spot ro image (not shown) in response to the impact of electron beam (not shown).

The liquid crystal device 14 is mounted at the cathode ray tube 12 at the region of the faceplate 22 such that images (not shown) produced at the screen 20 are viewable through the liquid crystal device 14. Such mounting can be done by clamping means 23 known in the art or by a suitable adhesive (not shown). The liquid crystal device 14 is comprised of an outer envelope 25 which includes tow flat, parallel, transparent plates 26 and 28 separated by a distance of, for example one-half mil. At least these two plates 26 and 28 of the outer envelope 25 are electrically insulating, it being preferred, however, that all parts of the outer envelope 25 be electrically insulating. The outer envelope 25 contains a layer 30 (not visible) of a liquid crystal material which has a nematic mesomorphic state. A more detailed description of the liquid crystal material is given below.

On the interior surface 32 of one of the plates 26 there is a plurality of electrode groups 40, 42 and 44. Each of these electrode groups 40, 42, and 44 is comprised of one or more individual electrodes 40a, 40b, and 40c; 42a and 42b; and 44a and 44, respectively. All of these electrodes 40a through 44 are made of a transparent conductive material, such as indium oxide or tin oxide, for example. All of the individual electrodes 40a through 44 comprising each respective electrode group 40, 42, and 44 are electrically interconnected but are electrically insulated from the electrodes of the other electrode groups.

Each electrode group 40, 42, and 44 is produced in the manner explained below such that it is substantially identical in configuration with a predetermined desired graticule, there being as many electrode groups as there are desired graticules. The individual electrodes 40a through 44 are of relatively narrow dimension (e.g. 1 mil wide and 1,000 angstroms thick) and may be closely disposed (e.g., one-half mil apart). As a result, a single display device 10 is capable of containing a large number of electrode groups, each having a relatively high electrode population. This results in a large variety and number of changeable graticules being available with a single display device 10.

The electrode groups 40, 42, and 44 are disposed on the plate 26 in a layered arrangement, the individual electrodes (e.g., 42a) of some electrode groups overlying, or coinciding with, the individual electrodes (e.g., 40a) of other of electrode groups at various crossover points. The various coinciding electrodes are electrically insulated from each other at their respective crossover points by means of transparent electrically insulating spacers 34 made, for example, of glass or silicon oxide. Each insulating spacer 34 has the approximate dimensions of the coincident areas of the respective electrodes which it separates. For purposes of illustration, all of the electrodes 40a through 44 and insulating spacers 34 are shown to be visible and the size of the electrodes 40a through 44 as well as the size of the envelope 25 is exaggerated. Also, for simplicity, only a relatively small number of electrode groups 40, 42, 44 is shown. In some instances (not shown) the individual electrodes of the electrode groups of a liquid crystal device might not have any areas which coincide so that all of these electrode groups are completely disposed on a transparent plate, there being no need to utilize insulating spacers. On the interior surface 33 of the other plate 28 there is an electrode structure 46 comprised of a continuous single layer of a transparent, electrically conducting material, such as indium oxide or tin oxide, for example. Each one of the electrodes 40a through 44 disposed on the first plate 26 is in registry with some portion of the electrode structure 46. Each electrode group and that portion of the electrode structure 46 in registry therewith are collectively referred to herein as an "electrode pair."

As previously mentioned, all of the individual electrodes comprising each respective electrode group 40, 42, and 44 are electrically interconnected but are electrically insulated from the other electrodes. Where an electrode group (e.g. 40) has a configuration such that one or more individual electrodes (e.g., 40a) thereof does not intersect with any other one of the electrodes (e.g., 40b) of the same electrode group (40), electrical connection therebetween is accomplished by means of a transparent conductor (not shown) between the nonintersecting member (40a) or members and the other members (40b) of the same electrode group (40). The surfaces of the transparent conductor exposed to the interior of the liquid crystal device 14 are covered, for reasons given below, with a transparent insulating material (not shown).

Insulated wires 60, 62 and 64 and 66 or other suitable insulated connecting means are respectively bonded to the electrode groups 40, 42 and 44 and the electrode structure 46. Such bonding may be done by means of a silver paste, for example. These wires 60 to 66 extend out of the liquid crystal device 14 and are connected to a commutator switch 80 and to a voltage source 82, as shown in FIG. 1. The commutator switch 80 permits the simultaneous energization of both the electrode structure 46 and one or more of the electrode groups 40 to 44 such that, where it is desired, a plurality of electrode pairs can be energized to provide simultaneously a plurality of graticules. The commutator switch 80; the connecting means 60 to 66; and the voltage source 82 are collectively referred to herein as "energizing means."

The liquid crystal device 14 is produced in the following manner. A first continuous layer (not shown) of a transparent electrically conducting material such as tin oxide, for example, is evaporated on one surface 32 of a transparent plate 26 which stands alone. Using photoresist-etch techniques known in the art, portions of the first conducting layer are removed so that there remains on the plate 26 a first electrode group 40 having the configuration of a desired graticule. Then, a continuous layer (not shown) of a transparent, electrically insulating material, such as glass, is evaporated on both the first electrode group 40 and the exposed portions of the surface 32 of the plate 26. After this, those portions of the insulating layer not located at those areas that have previously been determined to be crossover points of the first electrode group 40 and subsequent overlying electrode groups, are removed, by photoresist-etch techniques. In this way, insulating spacers 34 are produced at these electrode crossover points. A second group 42 of electrodes is then provided by the evaporation-photoresist-etch sequence discussed above. This second electrode group 42 is separated from underlying regions of the first electrode group 40 by the previously provided insulating spacers 34. Subsequent steps utilizing the above techniques may be employed to provide other insulating spacers at the cross over points if any, of foregoing electrode groups 40 and 42 and subsequently provided electrode groups. This is followed by the provision of the third electrode group 44 in the above described manner. Alternatively, by using methods known in the art, the various electrode groups and insulating spacers may be provided by evaporation through masks having predetermined patterns corresponding with the configurations of the desired graticules. The electrode structure 46 is provided by evaporation of a continuous layer (not shown) of a transparent conducting material (e.g., tin oxide) on the second plate 28, which stands alone. Thereafter, a wire 60, 62, 64, and 66 or other suitable connecting means is provided to each electrode group 40 through 44 and to the electrode structure 46. The wires 60 to 66 are bonded to the respective electrode groups and the electrode structure by means of a silver paste.

Thereafter, one of the plates 26 and 28 is bonded to a suitable frame member 36 (preferably made of insulating material) to produce an envelope subassembly. The frame member 36 is not required to be transparent. The plate (e.g., 26) is bonded such that each wire connected to the electrode groups or the electrode structure, as the case may be, thereon projects from the envelope subassembly. A nonconductive adhesive, for example, is used to bond the plate to the frame member 36. The subassembly is then provided with a quantity of a liquid crystal material which has a nematic mesomorphic phase, to form a liquid crystal layer 30 and the other plate (e.g., 28) is mounted on the subassembly in the same way. The electrode groups 40, 42, and 44 and the electrode structure 46 on both the respective plates 26 and 28 are in contact with the liquid crystal layer 30. The position of the first plate 26 bearing the electrode groups may be interchanged with that of the other plate 28 bearing the electrode structure so long as at least one of such plates bears electrode groups having the desired graticule configurations.

Nematic mesomorphic liquid crystal materials are generally transparent in the unactivated condition (i.e., where no voltage is applied thereto) but become nontransparent and exhibit a scattering of incident light in response to the application thereto of a voltage which produces an electric current in the material (i.e., upon electrical activation). Such behavior of these nematic mesomorphic liquid crystal materials has been designated as "dynamic scattering" by G. H. Heilmeirer et al., in their article "Dynamic Scattering: A New Electro-Optic Effect in Certain Classes of Nematic Liquid Crystals," appearing in Proceedings of the IEEE, Volume 56, Pages 1162—1171, July 1968. Examples of such liquid crystal materials are members of a class of organic compounds known as Schiff bases, one of which members is anisylidene para-aminophenylacetate. Other specific examples, as well as the theory of the operating mechanism, of nematic mesomorphic liquid crystal materials are given in the above-mentioned article. The scattering of incident light is generally limited to those portions of the nematic mesomorphic liquid crystal material which are subjected to electrical current, or electrically activated. Such scattering of incident light causes these electrically activated portions to vary in brightness from the unactivated, nonscattering portions, thus providing a visible image.

Some liquid crystal materials require some degree of heating to transform them to their nematic mesomorphic state while other such materials occur in the nematic mesomorphic state at room temperature. Either type of such liquid crystal materials is useable in this invention. Where it is required, however, heating of the liquid crystal material can be accomplished by means of external heaters, such as infrared heat lamps or heating coils in close proximity with the liquid crystal device, or transparent resistive layers on the outer surface of the envelope of the liquid crystal device, through which layers electricity is passed.

The operation of the display device 10 (FIGS. 1 and 2) is as follows. The cathode ray tube 12 is operated in conventional manner to produce the desired image on the screen 20. The operation of the liquid crystal devices 14 to produce the desired graticule involves, first the heating, if necessary, of the liquid crystal material by suitable heating means (not shown), such as those described above, to transform the liquid crystal material to its nematic mesomorphic state. In the case of anisylidene para-aminophenylacetate, such heating may be to about the 85° to 100° C. temperature range. Thereafter, there are simultaneously energized, by means of the commutator switch 80, both that electrode group (e.g., 40) with the configuration of the graticule that is sought to be provided and the electrode structure 46 which is disposed on plate 28. Such energization causes a voltage to be applied to only those localized portions of the nematic mesomorphic liquid crystal layer 30 which generally lie between the energized electrode group (i.e., 40) and electrode structure 46.

The applied voltage may be AC, DC, or pulsed DC. In the case of a one-half mil thick layer of anisylidene para-aminophenylacetate, the applied voltage may range from 10 to 100 volts DC at liquid crystal temperature of from 85° to 95° C. The subjection of the liquid crystal layer 30 to a voltage produces a current in the above-mentioned localized portions therein. This brings about the electrical activation of these localized portions of the liquid crystal layer 30 and the consequent changes in the optical properties thereof (viz., the scattering of incident light). These changes in optical properties generally occur at only the electrically activated portions of the liquid crystal layer 30. The incident light which is scattered may be ambient light or light produced by side-lighting means known in the cathode ray tube art. As a result of the scattering of incident light, those electrically activated portions of the liquid crystal layer 30 where scattering occurs appear lighter than the unactivated other portions of the layer 30 which remain transparent. The configuration of these lighter portions of the liquid crystal layer 30 is generally the same as that of the energized electrodes, thereby providing the image of a graticule having substantially the same configuration and dimensions of the energized electrode group. The contrast between the light portions and the unactivated portions of the liquid crystal layer 30 is dependent on the applied voltage, greater contrast resulting from higher applied voltages. The lighter portions of the liquid crystal layer 30 are visible through the transparent electrodes which are energized and are superimposed upon the image (not shown) produced by the cathode ray tube 12, which image is visible through the transparent unactivated portions of the liquid crystal layer 30. Portions of the light transmitted from the cathode ray tube 12 through the liquid crystal device 14 may be reflected back by the electrically activated portions of the liquid crystal layer 30. This back reflection is not significantly detrimental since a relatively large proportion of the light is transmitted through the unactivated transparent portions of the liquid crystal layer 30. This back reflection behavior may be utilized, however, in cases where there is a relatively high light output from the cathode ray tube 12 and the image provided thereby is substantially coextensive with the electrode groups of the liquid crystal device. In this case, the back reflection of light by the activated portions of the liquid crystal layer 30 will, in the absence of ambient light, cause these portions to be dark in comparison with the light-transmitting unactived portions. Hence, the graticule that is provided will appear darker than the background. This obviates the need for external, or ambient, lighting for the display device.

Because the insulating spacers 34 and the electrode groups are transparent and because the activated areas of the liquid crystal layer 30 are of relatively narrow dimensions, there is very little obstruction to the viewability of the image on the cathode ray tube 12 through the liquid crystal device 14. Some graticules may have discontinuities because of the crossover of their respective electrode groups with other electrode groups. This does not, however, appreciably detract from the utility of these graticules because the relatively small width of the respective electrodes of these electrode groups causes these discontinuities to be small so that the viewer's sense of line or pattern continuity is not lost.

The exposed surfaces of transparent conductors which interconnect nonintersecting electrodes of the various electrode groups are, as mentioned above, covered with a transparent insulating material in order to avoid any activation of the liquid crystal layer 30 by these conductors. If such activation were allowed, there would result, in addition to the graticule provided, undesirable lines which might be confusing to the observer.

It may readily be seen that a very large number of transparent electrode groups of varying configuration and/or orientation may be provided to a liquid crystal device without any appreciable obstruction, by these electrode groups, to the viewability of the image on the cathode ray tube. Hence, by selectively energizing, either jointly or separately, various ones of the electrode groups disposed on the liquid crystal device, a large number of graticules of various configurations and/or orientations may be obtained either individually or together. If it is desired to observe the image on the cathode ray tube without any graticule, the electrodes of the liquid crystal device are not energized.

Alternatively, a display device (not shown) embodying this invention may be made such that a single transparent plate of electrically insulating material comprises both the faceplate of the cathode ray tube and one plate of the liquid crystal envelope. In this case, transparent electrodes would be disposed on one surface of the plate while a phosphor would be disposed on the opposite surface.

The very short (significantly less than one second) rise times and decay times for nematic mesomorphic liquid crystal materials reported in the aforementioned article allow for the rapid production and erasure of the various graticules provided by the display device disclosed herein. These, plus the large number and variety of graticules that are producible and eliminable with relative ease by such a display device, make it a desirable and useful apparatus.

In addition, the novel display device alleviates many of the problems encountered in the prior art, including the confusability of graticule lines and poor viewability of the image.

I claim:

1. A display device for providing a changeable graticule superimposed upon a visible image, comprising:
   a. means for displaying a visual image to the view of an observer;
   b. means for providing a graticule superimposed on said visual image and visible to an observer, said means including
      i. an array of transparent electrode pairs and
      ii. a liquid crystal material between said electrode pairs, and
   c. connection means for electrically energizing selected ones of said electrode pairs.

2. A display device for providing a changeable graticule superimposed upon a visible image, comprising:
   a. means for providing an image;
   b. a hermetically sealed envelope disposed at said means, said envelope including two oppositely disposed transparent plates of electrically insulating material and being disposed such that provided images are viewable through said plates;
   c. a plurality of electrode groups disposed at the interior surface of a first one of said plates, each one of said electrode groups being comprised of at least one transparent electrode and all of said electrodes of each one of said electrode groups being electrically interconnected, each one of said electrode groups having substantially the same configuration as one of the desired said graticules and being electrically insulated from the other ones of said electrode groups;
   d. a transparent electrode structure disposed at the interior surface of the second of said plates, said electrode structure containing areas substantially coextensive with and in substantial registry with each one of said electrode groups;
   e. a liquid crystal material contained by said envelope, said liquid crystal material having a nematic mesomorphic phase and being in physical contact with said electrode groups and said electrode structure, said liquid crystal material being transparent in an electrically unactivated condition and scattering incident light in an electrically activated condition; and
   f. energizing means for applying voltage to said electrode groups and said electrode structure.

3. The display device defined in claim 2 wherein a first one of said electrode groups partially overlies another one of said electrode groups and is physically separate therefrom.

4. The display device defined in claim 3 wherein said first electrode group and said other electrode group are separated at their coincident areas by electrically insulating spacers.

5. The display device defined in claim 2 wherein each one of said electrode groups is completely disposed directly on said first plate.

6. The display device defined in claim 2 wherein said nematic liquid crystal material is selected from the group consisting of organic compounds classified as Schiff bases.

7. The display device defined in claim 6 wherein said organic compound is anisylidene para-aminophenylacetate.

8. The display device defined in claim 2 wherein said means for providing an image is a cathode ray tube.

9. The display device defined in claim 2 wherein means are provided thereto for heating said nematic liquid crystal material.

10. The display device defined in claim 2 wherein external illuminating means are provided thereto.